US00RE40018E

(19) United States
(12) Reissued Patent
Palermo et al.

(10) Patent Number: US RE40,018 E
(45) Date of Reissued Patent: Jan. 22, 2008

(54) TIME-MULTIPLEXED SHORT-RANGE MAGNETIC COMMUNICATIONS

(75) Inventors: Vincent Palermo, Westford, MA (US); Patrick J. Cobler, Nashua, NH (US); Neal R. Butler, Acton, MA (US)

(73) Assignee: Aura Communications Technology, Inc., North Andover, MA (US)

(21) Appl. No.: 09/993,328

(22) Filed: Nov. 6, 2001

Related U.S. Patent Documents

Reissue of:
(64) Patent No.: 5,982,764
Issued: Nov. 9, 1999
Appl. No.: 08/841,502
Filed: Apr. 23, 1997

U.S. Applications:

(63) Continuation-in-part of application No. 08/696,812, filed on Aug. 13, 1996, now Pat. No. 5,912,925, which is a continuation-in-part of application No. 08/444,017, filed on May 18, 1995, now abandoned.

(51) Int. Cl.
*H04J 3/00* (2006.01)

(52) U.S. Cl. ..... 370/345; 455/41.1; 455/101; 340/870.31

(58) Field of Classification Search ..... 370/336, 370/337, 345, 330, 347; 455/41, 101, 133, 455/121; 340/854.8, 870.33, 870.32, 448
See application file for complete search history.

(56) References Cited

U.S. PATENT DOCUMENTS

| | | | | |
|---|---|---|---|---|
| 3,617,890 A | | 11/1971 | Kurauchi et al. | 325/51 |
| 3,898,565 A | | 8/1975 | Takeuchi et al. | 325/28 |
| 4,061,972 A | | 12/1977 | Burgess | 325/16 |
| 4,117,271 A | | 9/1978 | Teeter et al. | 179/82 |
| 4,160,952 A | | 7/1979 | Seastrand, Jr. | 325/369 |
| 4,166,470 A | * | 9/1979 | Neumann | 607/33 |
| 4,298,874 A | | 11/1981 | Kuipers | |
| 4,334,315 A | | 6/1982 | Ono et al. | 455/11 |

(Continued)

FOREIGN PATENT DOCUMENTS

| | | |
|---|---|---|
| DE | 36 03 098 A1 | 1/1987 |
| DE | 93 09 032 | 12/1994 |
| DE | 29609349 | 12/1996 |
| DE | 36 03 098 A1 | 1/1997 |
| EP | 0 296 092 | 12/1988 |
| EP | 0700184 A2 | 3/1996 |
| FR | 2 431 227 | 7/1978 |

(Continued)

OTHER PUBLICATIONS

International Search Report for PCT/US98/07768, 7 pages.
International Search Report for PCT/US98/07785, 7 pages.

(Continued)

*Primary Examiner*—Andrew Lee
(74) *Attorney, Agent, or Firm*—Hamilton, Brook, Smith & Reynolds, P.C.

(57) ABSTRACT

A magnetic induction time-multiplexed two-way short-range wireless communications system, and related method, includes a first portable unit and a second portable unit. The first portable unit receives first unit input signals and provides first unit output signals. Also, the first portable unit includes a first unit transducer system for generating a first inductive field based upon the first unit input signals during a first time slot and for converting a second inductive field into the first unit output signals during a second time slot. The second portable unit receives second unit input signals and provides second unit output signals. Also, the second portable unit includes a second unit transducer system for generating the second inductive field based upon the second unit input signals during the second time slot and for converting the first inductive field into the second unit output signals during the first time slot.

122 Claims, 4 Drawing Sheets

U.S. PATENT DOCUMENTS

| | | | | | |
|---|---|---|---|---|---|
| 4,334,316 | A | | 6/1982 | Tanaka | 455/139 |
| 4,373,207 | A | | 2/1983 | Hecken | 455/139 |
| 4,373,210 | A | | 2/1983 | Karabinis et al. | 455/273 |
| 4,442,434 | A | | 4/1984 | Baekgaard | 343/701 |
| 4,489,330 | A | | 12/1984 | Marutake et al. | 343/742 |
| 4,513,412 | A | | 4/1985 | Cox | 370/29 |
| 4,542,532 | A | | 9/1985 | McQuilkin | 455/78 |
| 4,584,707 | A | | 4/1986 | Goldberg et al. | 455/41 |
| 4,600,829 | A | | 7/1986 | Walton | 235/439 |
| 4,633,519 | A | | 12/1986 | Gotoh | 455/277 |
| 4,642,786 | A | | 2/1987 | Hansen | |
| 4,647,722 | A | | 3/1987 | Nishida et al. | 379/63 |
| 4,654,883 | A | | 3/1987 | Iwata | 455/89 |
| 4,669,109 | A | | 5/1987 | LeCheviller et al. | 379/143 |
| 4,733,402 | A | | 3/1988 | Monsen | 375/100 |
| 4,747,158 | A | | 5/1988 | Goldberg et al. | 455/11 |
| 4,752,776 | A | | 6/1988 | Katzenstein | 340/825.54 |
| 4,845,751 | A | | 7/1989 | Schwab | 381/25 |
| 4,918,737 | A | | 4/1990 | Luethi | 381/68.4 |
| 4,967,695 | A | | 11/1990 | Giunta | 119/29 |
| 5,054,112 | A | | 10/1991 | Ike | 455/41 |
| 5,069,210 | A | * | 12/1991 | Jeutter et al. | 455/41 |
| 5,202,927 | A | * | 4/1993 | Topholm | 381/315 |
| 5,247,293 | A | | 9/1993 | Nakagawa | 340/825.25 |
| 5,276,686 | A | | 1/1994 | Ito | 370/95.1 |
| 5,276,920 | A | | 1/1994 | Kuisma | 455/101 |
| 5,390,357 | A | | 2/1995 | Nobusawa et al. | 455/134 |
| 5,437,057 | A | | 7/1995 | Richley et al. | 455/41 |
| 5,453,686 | A | | 9/1995 | Anderson | |
| 5,553,312 | A | | 9/1996 | Gattey et al. | 455/11.1 |
| 5,568,516 | A | | 10/1996 | Strohallen et al. | 375/259 |
| 5,577,026 | A | * | 11/1996 | Gordon et al. | 455/41 |
| 5,596,638 | A | | 1/1997 | Paterson et al. | 379/430 |
| 5,600,330 | A | | 2/1997 | Blood | |
| 5,615,229 | A | | 3/1997 | Sharma et al. | 375/259 |
| 5,722,050 | A | | 2/1998 | Chen | 455/66 |
| 5,771,438 | A | | 6/1998 | Palermo et al. | 455/41 |

FOREIGN PATENT DOCUMENTS

| | | |
|---|---|---|
| FR | 2431227 | 7/1978 |
| FR | 78/20886 | 7/1978 |
| GB | 1 164 281 | 9/1966 |
| GB | 2 197 160 A | 5/1988 |
| GB | 2 277 422 A | 10/1994 |
| WO | 92/17991 | 10/1992 |
| WO | 96/10878 | 4/1996 |
| WO | 96/37052 | 11/1996 |

OTHER PUBLICATIONS

International Search Report for PCT/US96/07144, 7 pages (Sep. 20, 1996).
Plantronics advertisement, Santa Cruz, CA, 1994, 1 page.
Jabra advertisement, San Diego, CA, 1994, 1 page.
Fujitsu advertisement, Reader Service No. 14, 1 page.
Hello Direct advertisement, 1 page.

* cited by examiner

TIME-MULTIPLEXED SHORT-RANGE MAGNETIC COMMUNICATIONS

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of: (1) U.S. patent application Ser. No. 08/444,017, filed May 18, 1995, abandoned; and (2) U.S. patent application Ser. No. 08/696,812, filed Aug. 13, 1996. The entirety of each of these two related U.S. patent applications is hereby incorporated hereinto by reference.

TECHNICAL FIELD

This invention relates to short-range wireless communications and, more particularly, to the use of inductive coupling.

BACKGROUND INFORMATION

When using a telephone, continually holding the handset to one's ear can be awkward. Also, holding the telephone interferes with the use of both hands for other work while trying to talk. In particular, the use of cellular telephones, which has increased dramatically, can interfere with the user's proper operation of an automobile. Various techniques have been used to overcome these difficulties.

Speakerphones allow one to talk while roaming around a room and using one's hands. However, speaker volume can disturb others around the user. They also cannot be used in close proximity to other speakerphones due to interference. They have limited privacy since the speaker broadcasts the conversation to all within earshot. Typically, the user must speak more loudly than normal to have proper reception at the microphone. Also, they tend to have poor sound quality because the user typically is not near the microphone and acoustics in the room typically are poor.

Headsets have been another way to free up the hands of a telephone user. Typically, the headset includes an adjustable strap extending across the user's head to hold the headset in place, at least one headphone located by the user's ear, and a microphone which extends from the headset along and around the user's face to be positioned in front of the users mouth. The headset is attached by a wire to the telephone. Headsets have the disadvantages of being bulky and somewhat awkward to use. Although they permit hands free use of the telephone, the user has limited mobility due to the connecting wire.

Wireless headsets also have been developed to eliminate the connecting wire to the telephone. The wireless headset uses radio frequency (RF) technology or infrared (IR) technology for communicating between the headset and a base unit coupled to the telephone. The need for communications circuitry and sufficient power to communicate with the base unit increases the bulk and weight of the headset. This increased weight can become tiresome for the user. One alternative has been to attach the headset by a wire to a transmitting unit worn on the belt of the user. Again, the use of a connecting wire can become inconvenient and interfere with other actions by the user. Significant interference rejection circuitry is also needed when multiple wireless headsets are used in close proximity.

SUMMARY OF THE INVENTION

The invention relates to a short-range, wireless communications system including a miniaturized portable transceiver unit and a base unit transceiver. The miniaturized portable transceiver unit sends and receives information through magnetic induction to the base unit, which may also be portable (i.e., easily carried by hand by a single person). Similarly, the base unit sends and receives information through magnetic induction to the portable transceiver. The information generally can be any type of information including voice, audio, data, music, and/or video. The use of magnetic induction fields limits interference between a plurality of systems operating in close proximity to each other, and it reduces the power requirements (e.g., the battery or batteries in the two units can be smaller in size and weight) which allows smaller size units and greater convenience as compared to other types of communications systems such as those using RF technology and IR technology.

Each of the base unit and the portable transceiver units includes one or more transducers. Each of the transducers preferably is a rod antenna such as a ferrite rod within a wire coil. Either or both of the units can include multiple transceivers arranged in a variety of configurations to generate multiple magnetic fields, and in such multiple-transducer embodiments a diversity circuit is used to receive and/or transmit on at least one of the transducers. For example, three orthogonally arranged transducers can be used in the base unit, the portable unit, or both. For each unit, whatever the physical arrangement of that unit's transducers with respect to each other, the multiple fields generated substantially eliminates mutual inductance nulls between the two units which typically occurs at certain positions in a generated magnetic field. In one embodiment, the multiple transducers are selectively operated based upon a strongest signal in order to limit power consumption.

In one embodiment according to the invention, the system is a time-multiplexed short-range wireless communications system including a headset with the miniaturized transceiver that communicates with the base unit through magnetic induction fields. The headset may be of the concha type in which the speaker fits into at least one of the use's ears without a strap across the head and the transceiving transducer is encapsulated into the microphone boom which is short and straight along the user's cheek. Also, the base unit may be a portable telephone, which can be attached to the user, to further transmit communications from the wireless communication system to a separate device such as a cellular telephone network or a cordless telephone unit. The headset may fit in a receptacle in the portable base unit in order to recharge the battery pack in the headset, and the battery pack may be recharged via the magnetic inductive link between the base unit and the headset.

In one aspect, the invention relates to a magnetic induction time-multiplexed two-way short-range wireless communications system. The system includes a first portable unit and a second portable unit. The first portable unit receives first unit input signals and provides first unit output signals, and the first portable unit includes a first unit transducer system for generating a first inductive field based upon the first unit input signals during a first time slot and for converting a second inductive field into the first unit output signals during a second time slot. The second portable unit receives second unit input signals and provides second unit output signals, and the second portable unit includes a second unit transducer system for generating the second inductive field based upon the second unit input signals during the second time slot and for converting the first inductive field into the second unit output signals during the first time slot.

In another aspect, the invention involves a method for magnetic induction time-multiplexed two-way short-range wireless communications. During a first predetermined period of time, a first portable unit with a first unit transducer system generates a first inductive field and a second portable unit with a second unit transducer system receives the first inductive field. During a second predetermined period of time, the second portable unit with the second unit transducer system generates a second inductive field and the first portable unit with the first unit transducer system receives the second inductive field.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
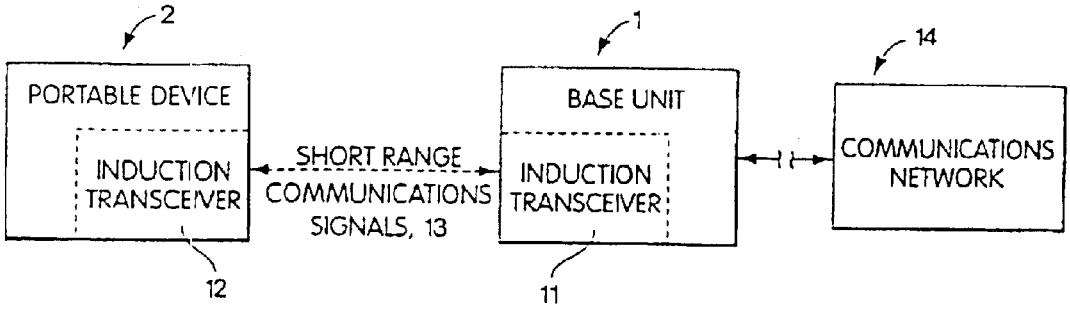
FIG. 1 is a schematic illustration of a wireless communication system according to the invention.

Referring to FIG. 1, a short-range magnetic communication system 1 includes a portable device 2 and a base unit 1 which connects to a long-range communication network 14. Contained within each of the base unit 1 and the portable device 2 is a short-range miniaturized magnetic induction transceiver 11, 12 which can simultaneously transmit and receive communications signals 13. These signals may be voice, audio, data, or video. The communications network 14 may be any network in which it would be desirable for these signals to be communicated over a terminal link without wires, such as a telephone network, personal communications (PCS) network, special mobile radio (SMR) network, computer system or network, and video conferencing systems. The base unit 1 may any part of the communications network 14 from which it would be desirable to communicate to another device without wires; for example, it may be a telephone handset, PCS handset, SMR handset, walkie-talkie, computer or computer peripheral devices, Personal digital assistant (PDA), or video game controller. The portable device 2 may be any device from which it would be desirable to communicate without wires to a communications network; for example, it may be a telephone headset or handset, portable computer or computer peripheral device, headphone, or video input device.

Figure 2:
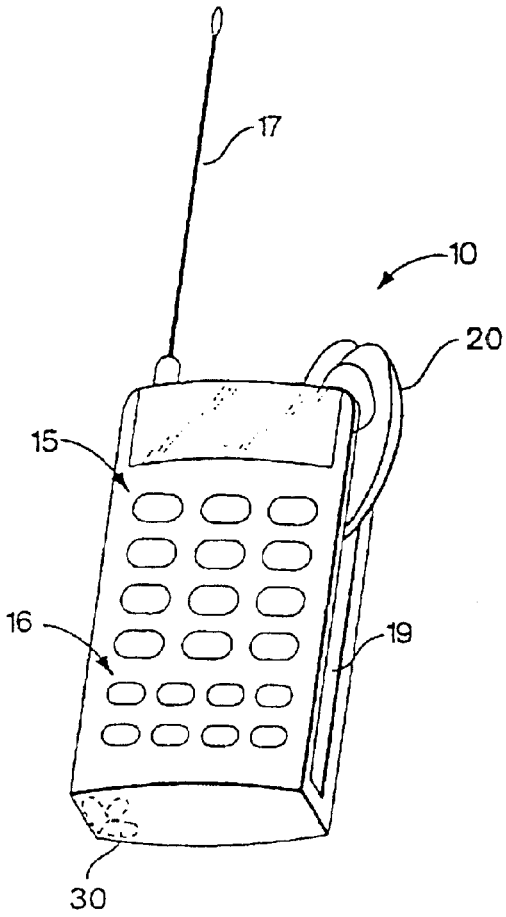
FIG. 2 is an illustration of a telephone handset as a base unit in the communication system of FIG. 1.

Referring to FIG. 2, one example of the base unit 1 is a portable telephone 10 having a plurality of number buttons 15 and a plurality of function buttons 16. A retractable antenna 17 communicates with a cellular telephone network or a cordless telephone base unit. The portable telephone 10 operates in a manner similar to that of an ordinary cellular or cordless telephone handset. Signals are sent to and received from the telephone network in an ordinary manner. The portable telephone 10 includes a transducer system 30 which communicates by magnetic induction with headset 20, which operates as the portable device 2, to provide the outputs and inputs to the portable telephone 10. The portable telephone 10 may also include a mouthpiece or earpiece (not shown) as in a regular telephone handset, allowing the user to choose between a conventional method of operation and a hands-free use afforded by the headset 20.

Figure 3:
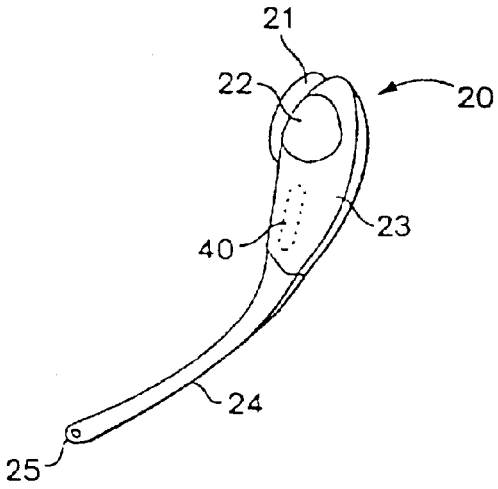
FIG. 3 is an illustration of a headset utilized as a portable device in the communication system of FIG. 1.

The portable device 2 as a headset 20 is shown more fully in FIG. 3. It includes a body portion 23 which houses a transducer 40 and processing circuitry. A speaker 22 is connected to the circuitry within the body 23. An earpiece 21 next to the speaker 22 fits in the user's ear to hold the unit in place and to allow the user to hear sounds from the speaker. A microphone boom 24 extends from the body 23 several inches in order to place a microphone 25, located at the end of the boom 24, close to the user's mouth. Alternatively the transducer 40 may be housed in the boom 24. A rechargable battery 51 is also housed in the body 23 of the headset 20 to provide power to the headset. Other features may be optionally included in the headset 20, such as switcher or buttons of manually activating different modes. For example, a capacitive switch or push-button could be used to cause the headset 20 to transmit a control signal to the portable phone 10 to activate muting of the microphone. The portable phone 10 may include a receptacle 19 for receiving and holding the headset 20. Depositing the headset in the receptacle can provide a variety of functions, in addition to maintaining the headset 20 and portable phone 10 together. A switch can be disposed in the receptacle to terminate the telecommunication when the headset 20 is inserted or initiate the telecommunication when it is removed. The receptacle may also include connections to recharge the battery 51 in the headset 20.

The base unit 1 and portable device 2 communicate through amplitude modulation of inductive fields, although other modulation methods such as frequency or phase modulation could be employed. During use, the distance between the portable device 2 and the base unit 1 typically is short. Since the distance is short, only an inductive field is necessary, and little or no radiation occurs. This limits the operating power, which allows a smaller size and weight for the rechargeable battery 51 and, thus, the portable device 2. Furthermore, it limits interference between systems operating in close proximity. Therefore, interference rejection circuitry may be limited or not necessary in the portable device 2.

Figure 4:
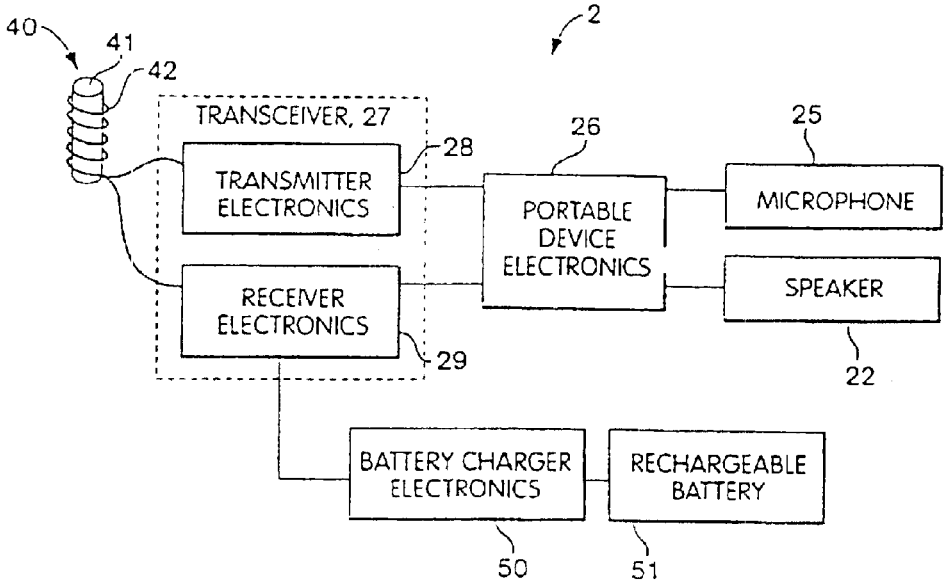
FIG. 4 is a schematic illustration of a transducer and electronics of a portable device according to the invention.

Referring to FIG. 4, for the transducer system in the portable device 2, the transducer 40 preferably includes a ferrite rod transducer having a ferrite rod 41 within a wire coil 42. The wires from the transducer 40 are connected to a transceiver 27 having transmitter electronics 28 and receiver electronics 29. The transceiver 27 connects to the portable device electronics 26, the nature of which is dependent upon the function of the portable device 2. In the example of the portable device as a headset 20, the portable device electronics would connect to a speaker 22 and a microphone 25. Transmission and reception can occur at different frequencies, which permits full duplex operation. Alternatively, separate transmitting and receiving transducers can be used.

Figure 5:
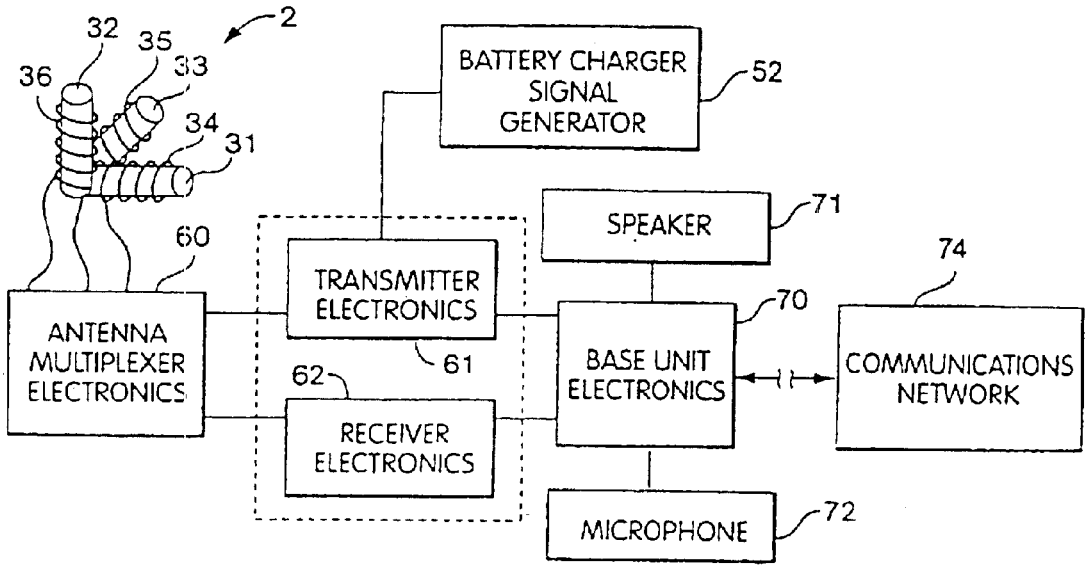
FIG. 5 is a schematic illustration of a transducer and electronics of a base unit according to the invention.

Referring to FIG. 5, for the base unit 1 configuration, the transducer system 30 includes three orthogonally disposed ferrite rod transducers, each including a ferrite rod 31, 32, 33 and a respective coil 34, 35, 36. The use of the orthogonally disposed transducers overcomes the occurrence of mutual inductance nulls in the resulting inductive fields. The three transducers are connected to multiplexer electronics 60 for selecting one or more of the transducers for transmission and reception. Circuitry may be used to select the transducer or transducers having the strongest signal for transmission and reception to reduce the total power consumption of the device. The transducer electronics 61 and receiver electronics 62 provide for processing of the communications signals from the base unit electronics 70 and the portable device 2. As discussed above, for a portable telephone 10, the conventional telephone speaker 71 and mouthpiece 72 may be eliminated so that the portable telephone 10 solely uses the headset 20 through the transducer system for communicating to the user. Switching circuitry (not shown) would be included to select between the speaker 71 and microphone 72, and the headset 20. The switching circuitry could be included in the receptacle 19 so that the speaker 71 and microphone 72 are disconnected when the headset 20 is removed.

Figure 6:
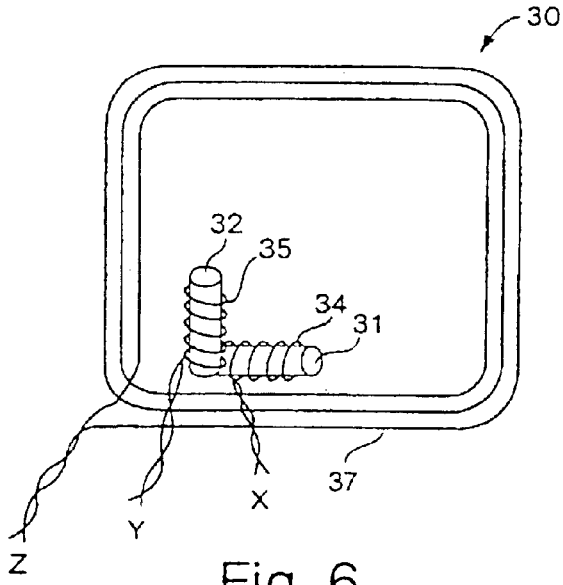
FIG. 6 is an illustration of another transducer configuration for the base unit.

Referring to FIG. 6, in another embodiment of the transducer system 30 for the base unit 1, one of the ferrite rod transducers is replaced with a loop coil transducer 37. A loop coil transducer can replace any or all of the ferrite rod transducers. The loop coil transducer 37 is disposed in the plane of the remaining ferrite rod transducers. This creates a transducer system having a decreased depth. As shown in FIG. 2, the three orthogonal transducers can be placed in a corner along the sides of the portable telephone 10. Alternatively, the loop coil transducer 37 could be placed along the back of the portable phone 10, so that is could made thinner.

Additionally, the transmission system can be used for charging the battery 51 of the portable device 2. The base unit 1 includes a battery charger signal generator 52 connected to the transmitter 61. This generator 52 produces a recharging signal which is sent through one of the ferrite rod transducers in the base unit 1 to the ferrite rod transducer 40 of the portable device 2. Since, in the telephone embodiment of FIG. 2, the headset 20 and transducer 40 have a known orientation when in the receptacle 19, only one transducer in the portable telephone 10 needs to be energized to transmit inductively the recharging signal. As shown in FIG. 3, the wires from the transducer 40 in the portable device 2 are connected to a battery charger 50 which is used to charge the battery 51.

Although the communication system has been illustrated in connection with a concha type headset 20 and a cellular or cordless telephone handset 10 as a base unit 1, it is readily adapted for other types of headsets and uses. The headset can be of the over-the-head type, over-the-ear type, or binaural type. The system can be used as a wireless connection to a conventional desktop telephone. Such a system would operate in the manner discussed above with the cordless handset. Since several such units may be used in close proximity, interference may become more of a problem. Therefore, the system can be designed to operate on various frequencies and can select frequencies for the transmission and reception which are unlikely to have significant interference. Similarly, the system can be used with a computer, either stationary or portable, for voice data entry, sound transmission, and telephone functions. The system can also be used with other types of communication systems including personal digital assistants (PDAs), cordless phones, PCS and SMR cellular phones, two way (e.g., video games), two-way half duplex (e.g., walkie-talkies and CBs), or two-way full duplex (e.g., phones). When the base unit is stationary and the user is likely to be at certain locations relative to the base unit, fewer transducers may be used in the base unit without encountering mutual inductance nulls. Alternative transducer systems may also be used for generating the inductive fields. Specifically, rather than a single transducer for transmission and reception on different frequencies, separate transducers may be used.

Other embodiments of a communications system according to the invention also are possible. For example, referring back to FIG. 1, the base unit 1 and the portable device 2 can communicate through magnetic induction in both directions using either analog or digital signals and/or transmission techniques. In an embodiment in which the information that is modulated on a carrier and inductively coupled from one unit (e.g., the portable device 2) to the other unit (e.g., the base unit 1) is digital data, the modulation scheme used can involve switching or keying the amplitude, frequency, or phase of the carrier in accordance with the incoming digital data. For example, the quadrature phase-shift keying (QPSK) modulation scheme can be employed. Other types of modulation schemes can be used such as quadrature-amplitude modulation (QAM). Regardless of whether the information transmitted and received is analog or digital, that information can represent a variety of different types of information such as audio, voice, music, video, data, control signals, etc. In some embodiments, higher carrier frequencies are used to get higher bandwidth communications. For example, a carrier at about 2 MHz can be used.

In a presently preferred embodiment according to the invention, full duplex two-way communication is achieved by time-multiplexing the modulated data in each direction. For speech, a multiplexing rate of 120 Hz can be used, and this corresponds to a delay of 8 milliseconds which is imperceptible to a user/listener.

Figure 7A:
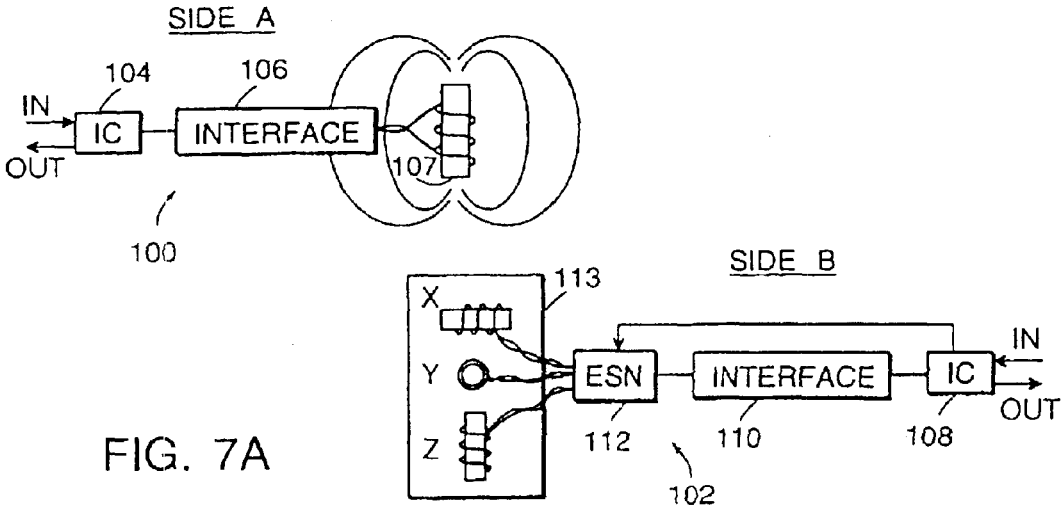
FIG. 7A is a block diagram of a time-multiplexed short-range wireless communications system according to the invention.
Figure 7B:
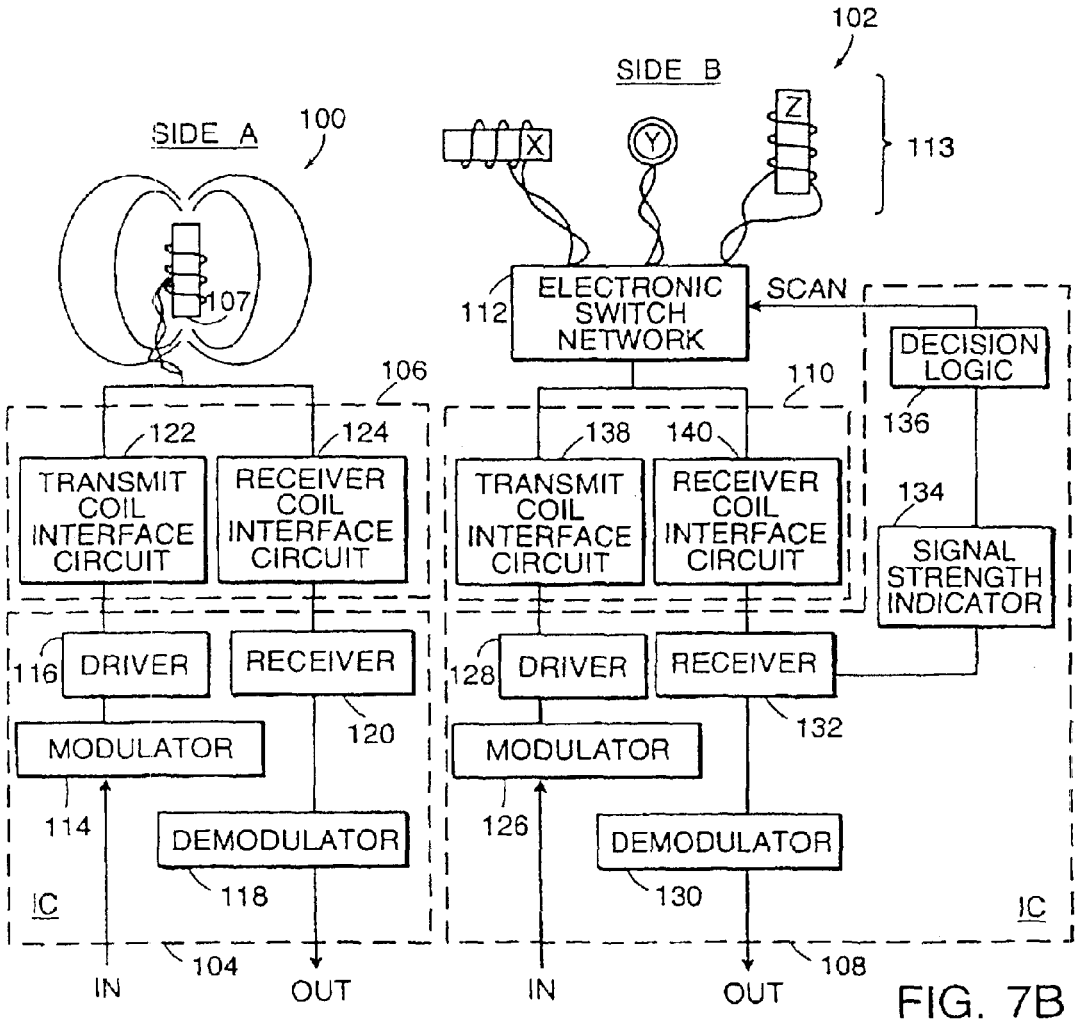
FIG. 7B is a more detailed diagram of the system of FIG. 7A.

Referring to FIGS. 7A and 7B, an embodiment of a time-multiplexed short-range wireless magnetic communications system according to the invention includes a portable unit 100 (e.g., the portable device 2) and another portable unit 102 (e.g., the base unit 1). The two portable units 100, 102 generally will be referred to hereinafter as "Side A" and "Side B" for convenience. Side A includes an integrated circuit (IC) 104, an interface 106, and a transducer system 107 (e.g., a single rod antenna). The IC 104 includes a modulator 114 for modulating the digital data, a driver 116 for driving the rod antenna, a demodulator 118 for demodulating the received signal, and a receiver 120 for recovering the small signal from the coil. The interface 106 includes a transmit coil interface circuit 122 for matching the driver to the coil and a receiver coil interface circuit 124 for matching the coil to the receiver. As for Side B, it includes an IC 108, an interface 110, an electronic switch network (ESN) 112, and a transducer system 113 (e.g., three orthogonally-arranged rod antenna—x, y, and z). The IC 108 includes a modulator 126 for modulating the digital data, a driver 128 for driving the rod antenna, a demodulator 130 for demodulating the received signal, a receiver 132 for recording the small signal from the coil, a signal strength indicator 134 for measuring the received signal from each coil, and decision logic 136 for selecting the best coil based on some algorithm. The interface 110 includes a transmit coil interface circuit 138 for matching the driver to the coil and a receiver coil interface circuit 140 for matching the coil to the receiver. The ESN 112 allows the transmit and receive coil interface circuits 138, 140 to be effectively multiplexed between the three rod antennas (x, y, and z) of the transducer system 113. The ESN 112 thus provides the advantage of reducing the size and cost of the inductive communications system of the invention by eliminating redundant interface components that would otherwise be needed to multiplex between the three rod antennas. That is, without the ESN 112, separate transmit and receive coil interface circuits would be needed for each of the three rod antennas, but with the ESN 112, only a single interface circuit 110 (which includes one transmit coil interface circuit 138 and one receive coil interface circuit 140) is needed in accordance with the invention.

The system of FIGS. 7A and 7B is a two-way system, and the two-way feature is implemented by time-multiplexing information through the inductive link between Side A and Side B. In operation, a typical sequence of events for the time-multiplexed communications system of the invention can be as follows. Side A transmits information (e.g., encoded and time-compressed voice data) to Side B for a prescribed amount of time such as 8 milliseconds using the modulator 114, the driver 116, the interface circuit 122, and the rod antenna 107. Side A starts transmitting by sending synchronization information for a small percentage of its total transmit time slot (e.g., 5 percent of 8 milliseconds or 0.4 milliseconds) referred to as the synchronization period. For the remainder of the transmit time slot (i.e., after the synchronization period but before the expiration of the 8 millisecond transmit time), Side A sends the actual information (e.g., the encoded and time-compressed voice data). Side B uses the synchronization period and timing to synchronize its receiver 132 and select the best coil or rod (x, y, or z) on which to receive the transmission being sent by Side A. The ESN 112, the interface circuit 140, the receiver 132, the signal strength indicator 134, and the decision logic 136 are used by Side B to determine which rod antenna (x, y, or z) is the best for receiving the transmission by Side A. This Side B hardware makes the determination by sequentially scanning each of the three rod antennas once and looking for the best (i.e., strongest) signal. Depending on the relative orientations of the Side A antenna 107 and the Side B transducer system 113, signals of different strengths and polarities will exist on the antennas of Side B (x, y, and z). It is possible that only one (or two) of the three rod antennas could have a signal while the other two (or one) have (or has) no signal. Although the three rod antennas of the transducer system 113 are required for full freedom of movement between Side A and Side B, two rod antennas can be used instead of three if some preferred orientation is known or desired regarding the two units (i.e., Side A and Side B). Also, a single rod antenna could be used at Side B, although such a single-antenna configuration of Side B's transducer system 113 may make it difficult to communicate when Side A and Side B start moving in an uncontrolled or unanticipated way with respect to each other. At the end of the synchronization period, Side B starts to receive the transmitted information from Side A on the rod antenna (x, y, or z) determined to be best. At the end of the Side A transmit time slot, the two sides (i.e., Side A and Side B) reverse roles, and Side B now transmits while Side A receives.

Side B transmits on the rod antenna it determined to be best for receiving from Side A during the previous time slot in which Side B was receiving from Side A. It should be noted here that, unlike a practical RF communications system, an inductive communications system according to the invention has the characteristic that the transmit and receive paths are substantially reciprocal. That is, the rod antenna that is determined to be the best for reception is also the rod antenna that will be best for transmission. This characteristic is exploited in the invention by transmitting on the rod antenna that was determined to be the best for reception. Side B transmits (on the best rod antenna) synchronization and actual information during the Side B transmit time slot (in the manner described above for Side A when it transmits during the Side A transmit time slot). The Side B transmit time slot can be, for example, 8 milliseconds in length with a beginning synchronization period of 0.4 milliseconds followed by a substantive or actual information transmit period of 7.6 milliseconds. Side A receives the synchronization information and the actual information on its rod antenna 107. Side A uses the synchronization information to synchronize its receiver 120. At the end of the synchronization period, Side A receives the actual information transmitted by Side B during the remainder of the Side B transmit time slot. After the Side B transmit time slot is completed, the process repeats itself. That is, Side A now transmits while Side B receives.

The actual or substantive information that gets sent by Side A is received by Side A on the IN line into the IC 104, and the actual or substantive information that gets sent by Side B is received by Side B on the IN line into the IC 108. Likewise, received and demodulated information is output from Side A and Side B on the OUT line of, respectively, the IC 104 and the IC 108. In a preferred embodiment, the receiving unit (whether that is Side A or Side B) both receives the transmission from the other unit and collects actual information coming in on its IN line simultaneously. This allows that receiving unit to be prepared to transmit when its turn comes at the end of the current period during which the other unit is transmitting. Similarly, the transmitting unit, while it is transmitting via its transducer system to the now-receiving unit, sends the information it just received in the last time slot out on its OUT line.

Each of the units 100, 102 includes electronic storage or memory (not shown) for storing actual information that is input via the IN line of the unit, and that stored information is extracted and transmitted when it is that unit's turn to transmit. The memory included in each unit 100, 102 typically will hold at least about 16 milliseconds of actual information such as voice data.

An 8 millisecond transmit time slot has been used as an example above for both the Side A and Side B transmit time slots. Transmit time slots of other durations can be used. In general, the duration of the transmit time slot for both Side A and Side B, is selected to allow the transmission and reception of a reasonable amount of information with a minimum of overhead while still maintaining the ability to track movements of the two portable units 100, 102 (i.e., Side A and Side B).

If the system just described communicates digital data, the following might, as an example, be the data stream or data packet that gets sent from one unit to the other:

1) a synchronization header having 32 bits followed by
2) 12 encryption bits followed by
3) voice data represented by 512 bits followed by
4) 12 termination bits.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A magnetic induction time-multiplexed two-way short-range wireless communications system, comprising:

a first unit for receiving first unit input signals and providing first unit output signals, the first unit including a first unit transducer system for generating a first inductive field based upon the first unit input signals during a first time slot and for receiving a second inductive field during a second time slot, the first unit transducer system comprising at least one transducer, a first unit processing circuit for modulating the first unit input signals during the first time slot, driving the at least one transducer with the modulated first unit input signals during the first time slot to cause the at least one transducer to generate the first inductive field, the receiving and demodulating the second inductive field to produce the first unit output signals during the second time slot, and a first unit interface circuit for matching the first unit transducer system to the first unit processing circuit; and a second unit for receiving second unit input signals and providing second unit output signals, the second unit including a second unit transducer system for generating the second inductive field based upon the second unit input signals during the second time slot and for receiving the first inductive field during the first time slot, the second unit transducer system comprising at least three transducers wherein each of the at least three transducers is arranged orthogonally with respect to the other transducers, a second unit processing circuit for modulating the second unit input signals during the second time slot, driving one of the at least three orthogonal transducers with the modulated second unit input signals during the second time slot to cause the one of the at least three orthogonal transducers to generate the second inductive field, and receiving and demodulating the first inductive field to produce the second unit output signals during the first time slot, a second unit interface circuit for matching the second unit transducer system to the second unit processing circuit, and a second unit switch network for coupling one of the at least three orthogonal transducers to the second unit interface circuit.

2. The system of claim 1 wherein the first unit transducer system comprises a single transducer.

3. The system of claim 2 wherein the single transducer comprises a rod antenna.

4. The system of claim 1 wherein each of the at least three orthogonal transducers of the second unit transducer system comprises a rod antenna.

*5. A method for magnetic induction time-multiplexed two-way short-range wireless communications, comprising:*

*during a first period of time, generating from a first unit with a first unit transducer system a first inductive field and receiving the first inductive field at a second unit with a second unit transducer system, the first transducer system including multiple transducers; and*

*during a second period of time, generating from the second unit with the second unit transducer system a second inductive field and receiving the second inductive field at the first unit with the first transducer system, the second transducer system including at least one transducer, at least one transducer of the first or second transducer systems functioning as a transmitter and a receiver of an inductive field.*

*6. The method as claimed in claim 5 further including selecting at least one of the multiple transducers of the first transducer system to generate or receive the first or second inductive fields, respectively.*

*7. A method as in claim 5, wherein the first unit and second units are portable transceiver devices.*

*8. A method for communicating information over wireless links, the method comprising:*

*generating a varying magnetic field from a first unit during a first time slot to transmit information over a wireless link, the first unit including multiple transducers, at least one of which functions as both a transmitter and receiver of a varying magnetic field;*

*generating a varying magnetic field from a second unit during a second time slot to transmit information over the wireless link;*

*transmitting information from the second unit to the first unit; and*

*selecting a transducer of the first unit to generate a varying magnetic field depending on which of the multiple transducers in the first unit receives a strongest signal from the second unit.*

*9. A method as in claim 8 further comprising:*

*positioning each of the multiple transducers in the first unit to be uniquely oriented with respect to each other.*

*10. A method as in claim 8 further comprising:*

*disposing a single transducer in the second unit for receiving information from the first unit and transmitting information from the second unit over the single transducer to the first unit.*

*11. A method as in claim 8 further comprising:*

*selecting a carrier frequency for transmitting information over the wireless link to avoid interference.*

*12. A method as in claim 8, wherein the first unit and second units are portable transceiver devices.*

*13. A method as in claim 8 further comprising:*

*transmitting termination bits at the end of a time slot.*

*14. A method as in claim 8 further comprising:*

*compressing the information for transmission during a time slot.*

*15. A method as in claim 8 further comprising:*

*modulating the information onto a carrier frequency for transmission during a time slot.*

*16. A method as in claim 8 further comprising:*

*encrypting the information for transmission during a time slot.*

*17. A method as in claim 8, wherein the first unit transmits to the second unit during the first time slot and the second unit transmits to the first unit during the second time slot.*

*18. A method as in claim 17, wherein the second unit is disposed in a headset including a speaker and microphone, and the first unit is disposed in a cellular telephone device.*

*19. A method as in claim 17, wherein the wireless link between the first unit and second units support two-way half duplex communication.*

*20. A method as in claim 17, wherein the first unit transmits information over one of three transducers and the second unit transmits and receives over a single transducer.*

*21. A method as in claim 17, wherein an orientation of the first unit relative to the second unit changes over time.*

*22. A method as in claim 17, wherein the first unit is coupled to a communications network and the wireless link between the second unit and first unit is part of a logical connection between the second unit and the communications network.*

*23. A method as in claim 17 further comprising:*

*detecting which of multiple transducers disposed in the first unit produces a strongest received signal from the second unit; and*

*generating a varying magnetic field in a time slot from the first unit on a transducer device oriented on a similar axes as the transducer that produces the strongest received signal.*

*24. A method as in claim 23, wherein the first unit detects which of multiple transducers receives a strongest signal in a previous time slot to transmit on that transducer in a following time slot.*

*25. A method as in claim 17 further comprising:*

*utilizing a portion of the first time slot to transmit synchronization information from the first unit to the second unit.*

*26. A method as in claim 25 further comprising:*

*synchronizing the second unit to receive during the first time slot based on received synchronization information from the first unit.*

*27. A method as in claim 25 further comprising:*

*at the second unit, receiving data information from the first unit following receipt of the synchronization information.*

*28. A method as in claim 17 further comprising:*

*tracking movements of the first unit relative to the second unit for maintaining communication over the wireless link.*

*29. A method as in claim 17 further comprising:*

*at the first unit, processing data information received in a previous time slot while transmitting to the second unit in a following time slot.*

*30. A method for communicating information over a wireless link, the method comprising:*

*from a first unit including multiple transducers uniquely oriented with respect to each other and at least one of which functioning as both a transmitter and receiver of a varying magnetic field, generating a varying magnetic field to transmit synchronization information and data information over the wireless link;*

*at a second unit, receiving the varying magnetic field and using the synchronization information to synchronize the second unit to receive the data information over the wireless link;*

*transmitting a signal from the second unit; and*

*selecting a transducer of the first unit to generate a varying magnetic field depending on which of the multiple transducers receives a strongest signal from the second unit.*

*31. A method as in claim 30, wherein the synchronization information is a header including multiple bit.*

*32. A method as in claim 30 further comprising:*

*disposing a single transducer in the second unit for receiving information from the first unit and transmitting information from the single transducer in the second unit to the first unit.*

*33. A method as in claim 30, wherein the wireless link between the first unit and second unit supports two-way full duplex communication.*

*34. A method as in claim 30, wherein the first unit transmits information over one of three transducers and the second unit transmits and receives over a single transducer.*

*35. A method as in claim 30, wherein the second unit is disposed in a headset including a speaker and microphone, and the first unit is disposed in a cellular telephone device.*

*36. A method as in claim 30, wherein an orientation of the first unit and second unit changes over time.*

*37. A method as in claim 30, wherein the first unit is a portable transceiver device.*

*38. A method as in claim 37, wherein the second unit is a portable transceiver device.*

*39. A method as in claim 30, wherein the first unit is coupled to a communications network and the wireless link is part of a logical connection between the second unit and the communications network.*

*40. A method as in claim 30 further comprising:*

*transmitting a signal from the second unit; and*

*detecting which of multiple transducers disposed in the first unit produces a strongest received signal from the second unit; and*

*generating a varying magnetic field in a time slot from the first unit on a transducer device oriented on similar axes as the transducer that produces the strongest received signal.*

*41. A method as in claim 30 further comprising:*

*at the second unit, receiving data information from the first unit following receipt of the synchronization information.*

*42. A method as in claim 30 further comprising:*

*utilizing a portion of the time slot to transmit synchronization information from the first unit to the second unit.*

*43. A method as in claim 42 further comprising:*

*synchronizing the second unit to receive in the time slot based on received synchronization information.*

*44. A method as in claim 40, wherein the first unit detects which of multiple transducers receives a strongest signal in a previous time slot to transmit on the transducer in a following time slot.*

*45. A method as in claim 30 further comprising:*

*tracking movements of the first unit relative to the second unit for maintaining communication over the wireless link.*

*46. A method as in claim 30 further comprising:*

*compressing the information for transmission over the wireless link in a time slot.*

*47. A method as in claim 30 further comprising:*

*processing data information received in a previous time slot while transmitting in a reverse direction in a following time slot.*

*48. A system for communicating information over wireless links, the system comprising:*

*a first unit including at least two transducers to transmit and receive and at least one of said at least two transducers functioning as both a transmitter and receiver of a varying magnetic field, the first unit generating a varying magnetic field during a first time slot to transmit information; and*

*a second unit including at least one transducer to transmit and receive, the second unit receiving the varying magnetic field during the first time slot to receive the information transmitted by the first unit, the second unit transmitting information to the first unit during a second time slot not overlapping with the first time slot, a transducer of the first unit generating a varying*

*magnetic field depending on which of the at least two transducers receives a strongest signal from the second unit.*

*49. A system as in claim 48, wherein the at least two transducers in the first unit are uniquely oriented with respect to each other.*

*50. A system as in claim 48, wherein a single transducer is disposed in the second unit for receiving information from the first unit and transmitting information to the first unit.*

*51. A system as in claim 48, wherein the wireless link between the first unit and second unit supports two-way full duplex communication.*

*52. A system as in claim 48, wherein the first unit transmits information over one of three uniquely oriented transducers and the second unit transmits and receives over a single transducer.*

*53. A system as in claim 48, wherein an orientation of the first unit and second unit changes over time due to motion of a user.*

*54. A system as in claim 48 further comprising:*

*a first circuit to detect which of multiple transducers disposed in the first unit produces a strongest received signal from the second unit; and*

*a second circuit to generate a varying magnetic field in a time slot from the first unit on a transducer device oriented on a similar axes as the transducer that produces the strongest received signal.*

*55. A system as in claim 54, wherein the first unit detects which of multiple transducers receives a strongest signal in a previous time slot to transmit on the transducer in a following time slot.*

*56. A system as in claim 48, wherein a portion of the time slot is used to transmit synchronization information from the first unit to the second unit.*

*57. A system as in claim 56, wherein the second unit synchronizes to receive in the time slot based on the received synchronization information.*

*58. A system as in claim 48, wherein movements of the first unit relative to the second unit are tracked for maintaining communication over the wireless link.*

*59. A system as in claim 48, wherein data information received in a previous time slot is processed while other data information is transmitted in a reverse direction in a following time slot.*

*60. A system for communicating information over a wireless link, the system comprising:*

*a first unit including at least two transducers to transmit and receive and at least one of said at least two transducers functioning as both a transmitter and receiver of a varying magnetic field, the first unit generating a varying magnetic field to transmit synchronization information and data information over the wireless link; and*

*a second unit including at least one transducer to transmit and receive, the first and second units being movable relative to each other, the second unit receiving the varying magnetic field and using the synchronization information to receive the data information over the wireless link, a transducer of the first unit generating a varying magnetic field depending on which of the at least two transducers receives a strongest signal from the second unit.*

*61. A system as in claim 60, wherein the at least two transducers in the first unit are uniquely oriented with respect to each other.*

*62. A system as in claim 60, wherein a single transducer is disposed in the second unit for receiving information from the first unit and transmitting information to the first unit.*

*63. A system as in claim 60, wherein the wireless link between the first unit and second unit supports two-way full duplex communication.*

*64. A method as in claim 60, wherein the first unit transmits information over one of three uniquely oriented transducers and the second unit transmits and receives over a single transducer.*

*65. A system as in claim 60, wherein an orientation of the first unit and second unit changes over time due to motion of a user.*

*66. A system as in claim 60, wherein a carrier frequency is selected for transmitting information over the wireless link to avoid interference.*

*67. A system as in claim 60 further comprising:*

*a first circuit to detect which of multiple transducers disposed in the first unit produces a strongest received signal from the second unit; and*

*a second circuit to generate a varying magnetic field in a time slot from the first unit on a transducer device oriented on a similar axis as the transducer that produces the strongest received signal.*

*68. A system as in claim 60, wherein the first unit detects which of multiple transducers receives a strongest signal in a previous time slot to transmit on the transducer in a following time slot.*

*69. A system as in claim 60, wherein a portion of the time slot is used to transmit synchronization information from the first unit to the second unit.*

*70. A system as in claim 69, wherein the second unit synchronizes to receive in the time slot based on the received synchronization information.*

*71. A system as in claim 60, wherein movements of the first unit relative to the second unit are tracked for maintaining communication over the wireless link.*

*72. A system as in claim 60, wherein data information received in a previous time slot is processed while other data information is transmitted in a reverse direction in a following time slot.*

*73. A method for communicating information over wireless links, the method comprising:*

*generating a varying magnetic field from a first unit during a first time slot to transmit information over a wireless link;*

*generating a varying magnetic field from a second unit during a second time slot to transmit information over the wireless link; and*

*transmitting termination bits at the end of a time slot.*

*74. A method for communicating information over wireless links, the method comprising:*

*generating a varying magnetic field from a first unit during a first time slot to transmit information over a wireless link;*

*generating a varying magnetic field from a second unit during a second time slot to transmit information over the wireless link;*

*transmitting information from the first unit to the second unit during the first time slot and transmitting information from the second unit to the first unit during the second time slot;*

*wherein an orientation of the first unit relative to the second unit changes over time.*

*75. A method as in claim 74 further comprising:*

*detecting which of multiple transducers disposed in the first unit produces a strongest received signal from the second unit; and*

*generating a varying magnetic field in a time slot from the first unit on a transducer device oriented on a similar axis as the transducer that produces the strongest received signal.*

*76. A method as in claim 75 further including detecting which of the multiple transducers in the first unit receives a strongest signal in a previous time slot to transmit on that transducer in a following time slot.*

*77. A method as in claim 74 further comprising:*

*utilizing a portion of the first time slot to transmit synchronization information from the first unit to the second unit.*

*78. A method as in claim 77 further comprising:*

*synchronizing the second unit to receive during the first time slot based on received synchronization information from the first unit.*

*79. A method as in claim 77 further comprising:*

*at the second unit, receiving data information from the first unit following receipt of the synchronization information.*

*80. A method as in claim 74 further comprising:*

*at the first unit, processing data information received in a previous time slot while transmitting to the second unit in a following time slot.*

*81. A method as in claim 74 further comprising:*

*generating the magnetic field from the first unit in multiple unique orientations.*

*82. A method for communicating information over wireless links, the method comprising:*

*generating a varying magnetic field from a first unit during a first time slot to transmit information over a wireless link;*

*generating a varying magnetic field from a second unit during a second time slot to transmit information over the wireless link; and*

*tracking movements of the first unit relative to the second unit for maintaining communication over the wireless link.*

*83. A method as claimed in claim 82, the method further comprising:*

*operating a transducer system in the first unit, the transducer system containing multiple uniquely oriented transducers.*

*84. A method as claimed in claim 83, the method further comprising:*

*detecting which of the multiple transducers disposed in the first unit produces a strongest received signal from the second unit.*

*85. A method for communicating information over a wireless link, the method comprising:*

*from a first unit, generating a varying magnetic field to transmit synchronization information and data information over the wireless link and transmitting both types of information over one of three transducers;*

*at a second unit, receiving the varying magnetic field at a single transducer used to transmit and receive and using the synchronization information to synchronize the second unit to receive the data information over the wireless link.*

*86. A method for communicating information over a wireless link, the method comprising:*

*from a first unit, generating a varying magnetic field to transmit synchronization information and data information over the wireless link;*

*at a second unit, receiving the varying magnetic field and using the synchronization information to synchronize the second unit to receive the data information over the wireless link;*

*transmitting a signal from the second unit;*

*detecting which of multiple transducers disposed in the first unit produces a strongest received signal from the second unit; and*

*generating a varying magnetic field in a time slot from the first unit on a transducer device oriented on similar axes as the transducer that produces the strongest received signal.*

*87. A method for communicating information over a wireless link, the method comprising:*

*from a first unit, generating a varying magnetic field to transmit synchronization information and data information over the wireless link;*

*at a second unit, receiving the varying magnetic field and using the synchronization information to synchronize the second unit to receive the data information over the wireless link; and*

*tracking movements of the first unit relative to the second unit for maintaining communication over the wireless link.*

*88. A method as claimed in claim 87, the method further comprising:*

*operating a transducer system in the first unit, the transducer system containing multiple uniquely oriented transducers.*

*89. A method as claimed in claim 88, the method further comprising:*

*detecting which of the multiple transducers disposed in the first unit produces a strongest received signal from the second unit.*

*90. A system for communicating information over wireless links, the system comprising:*

*a first unit including at least two uniquely oriented transducers to transmit and receive, the first unit generating a varying magnetic field during a first time slot to transmit information over one of the transducers; and*

*a second unit including at least one transducer to transmit and receive, the second unit receiving the varying magnetic field during the first time slot to receive the information transmitted by the first unit, the second unit transmitting information to the first unit during a second time slot not overlapping with the first time slot.*

*91. A system for communicating information over wireless links, the system comprising:*

*a first unit including at least two transducers to transmit and receive, the first unit generating a varying magnetic field during a first time slot to transmit information; and*

*a second unit, changing orientation over time with respect to the first unit, including at least one transducer to transmit and receive, the second unit receiving the varying magnetic field during the first time slot to receive the information transmitted by the first unit, the second unit transmitting information to the first unit during a second time slot not overlapping with the first time slot.*

*92. A system for communicating information over wireless links, the system comprising:*

*a first unit including at least two transducers to transmit and receive, the first unit generating a varying magnetic field during a first time slot to transmit information;*

*a second unit including at least one transducer to transmit and receive, the second unit receiving the varying*

*magnetic field during the first time slot to receive the information transmitted by the first unit, the second unit transmitting information to the first unit during a second time slot not overlapping with the first time slot;*

*a first circuit to detect which of multiple transducers disposed in the first unit produces a strongest received signal from the second unit; and*

*a second circuit to generate a varying magnetic field in a time slot from the first unit on a transducer device oriented on a similar axis as the transducer that produces the strongest received signal.*

*93. A system for communicating information over wireless links, the system comprising:*

*a first unit including at least two transducers to transmit and receive, the first unit generating a varying magnetic field during a first time slot to transmit information; and*

*a second unit including at least one transducer to transmit and receive, the second unit receiving the varying magnetic field during the first time slot to receive the information transmitted by the first unit, the second unit transmitting information to the first unit during a second time slot not overlapping with the first time slot; and*

*a tracking circuit coupled to the first or second units to track movements of the first unit relative to the second unit to maintain communication over the wireless link.*

*94. A system for communicating information over wireless links, the system comprising:*

*a first unit including at least two transducers to transmit and receive, the first unit generating a varying magnetic field during a first time slot to transmit (i) information and (ii) termination bits at the end of the first time slot; and*

*a second unit including at least one transducer to transmit and receive, the second unit receiving the varying magnetic field during the first time slot to receive the information and termination bits transmitted by the first unit, the second unit transmitting (i) information to the first unit during a second time slot not overlapping with the first time slot and (ii) termination bits at the end of the second time slot.*

*95. A system for communicating information over a wireless link, the system comprising:*

*a first unit including at least three uniquely oriented transducers to transmit and receive, the first unit generating a varying magnetic field to transmit synchronization information and data information over one of the three transducers over the wireless link; and*

*a second unit including at least one transducer to transmit and receive, the first and second units being movable relative to each other, the second unit receiving the varying magnetic field and using the synchronization information to receive the data information over the wireless link.*

*96. A system for communicating information over a wireless link, the system comprising:*

*a first unit including at least two transducers to transmit and receive, the first unit generating a varying magnetic field to transmit synchronization information and data information over the wireless link; and*

*a second unit, changing orientation over time with respect to the first unit due to motion of a user, including at least one transducer to transmit and receive, the first and second units being movable relative to each other, the second unit receiving the varying magnetic field and using the synchronization information to receive the data information over the wireless link.*

*97. A system for communicating information over a wireless link, the system comprising:*

*a first unit including at least two transducers to transmit and receive, the first unit generating a varying magnetic field to transmit synchronization information and data information over the wireless link;*

*a second unit including at least one transducer to transmit and receive, the first and second units being movable relative to each other, the second unit receiving the varying magnetic field and using the synchronization information to receive the data information over the wireless link;*

*a first circuit to detect which of multiple transducers disposed in the first unit produces a strongest received signal from the second unit; and*

*a second circuit to generate a varying magnetic field in a time slot from the first unit on a transducer device oriented on a similar axes as the transducer that produces the strongest received signal.*

*98. A system for communicating information over a wireless link, the system comprising:*

*a first unit including at least two transducers to transmit and receive, the first unit generating a varying magnetic field to transmit synchronization information and data information over the wireless link;*

*a second unit including at least one transducer to transmit and receive, the first and second units being movable relative to each other, the second unit receiving the varying magnetic field and using the synchronization information to receive the data information over the wireless link; and*

*a tracking circuit coupled to the first or second units to track movements of the first unit relative to the second unit to maintain communication over the wireless link.*

*99. A system for communicating information over wireless link, the system comprising:*

*a first unit including at least two transducers to transmit and receive, the first unit generating a varying magnetic field to transmit (i) synchronization information and data information over the wireless link and (ii) termination bits at the end of the first time slot; and*

*a second unit including at least one transducer to transmit and receive, the first and second units being relative to each other, the second unit receiving the varying magnetic field and using the synchronization information to receive the data information and termination bits over the wireless link.*

*100. A system for magnetic induction time-multiplexed two-way short-range wireless communications, the system comprising:*

*a first unit, with a first unit transducer system including multiple transducers generating during a first period of time a first inductive field and receiving a second inductive field during a second period of time,*

*a second unit, with a second unit transducer system including at least one transducer, the first unit receiving the first inductive field during the first period of time and generating the second inductive field during a second period of time;*

*at least one transducer of the first or second transducer systems functioning as a transmitter and a receiver of an inductive field.*

*101. A system as in claim 100, wherein the first unit and second unit are portable transceiver devices.*

*102. A system as in claim 100 wherein:*

*each of the multiple transducers in the first unit are positioned to be uniquely oriented with respect to each other.*

*103. A system as in claim 100, wherein a single transducer is disposed in the second unit for receiving information from the first unit and transmitting information to the first unit.*

*104. A system as in claim 100, wherein the wireless link between the first unit and second unit supports two-way full duplex communication.*

*105. A system as in claim 100, wherein the first unit transmits information over one of three uniquely oriented transducers and the second unit transmits and receives over a single transducer.*

*106. A system as in claim 100, wherein the second unit is disposed in a headset including a speaker and microphone, and the first unit is disposed in a wireless telephone device.*

*107. A system as in claim 100, wherein an orientation of the first unit and second unit changes over time due to motion of a user.*

*108. A system as in claim 100, wherein a carrier frequency is selected for transmitting information over the wireless link to avoid interference.*

*109. A system as in claim 100, wherein the first unit is a portable transceiver device.*

*110. A system as in claim 100, wherein the second unit is a portable transceiver device.*

*111. A system as in claim 100, wherein the first unit is coupled to a communications network and the wireless link between the second unit and first unit is part of a logical connection between the second unit and the communications network.*

*112. A system as in claim 100 further comprising:*

*a first circuit to detect which of the multiple transducers disposed in the first unit produces a strongest received signal from the second unit; and*

*a second circuit to generate a varying magnetic field in a time slot from the first unit on a transducer device oriented on a similar axis as the transducer that produces the strongest received signal.*

*113. A system as in claim 100, wherein the first unit detects which of the multiple transducers receives a strongest signal in a previous second period of time to select a transducer with which to transmit in a following first period of time.*

*114. A system as in claim 100, wherein a portion of the first period of time is used to transmit synchronization information from the first unit to the second unit.*

*115. A system as in claim 114, wherein the second unit synchronizes to receive in the second period of time based on the received synchronization information.*

*116. A system as in claim 114, wherein the second unit receives data information from the first unit following receipt of the synchronization information in the first period of time.*

*117. A system as in claim 100, wherein movements of the first unit relative to the second unit are tracked for maintaining communication over the wireless link.*

*118. A system as in claim 100, wherein termination bits are transmitted at the end of the first and second periods of time.*

*119. A system as in claim 100, wherein the information is compressed for transmission over the wireless link in the first or second periods of time.*

*120. A system as in claim 100, wherein information is modulated onto a carrier frequency for transmission from the first unit to the second unit.*

*121. A system as in claim 100, wherein data information received in a previous period of time is processed while other data information is transmitted in a reverse direction in a following period of time.*

*122. A system as in claim 100, wherein information is encrypted for transmission over a wireless link between the first unit and second unit in the first or second period of time.*

* * * * *

UNITED STATES PATENT AND TRADEMARK OFFICE

CERTIFICATE OF CORRECTION

PATENT NO. : RE 40,018 E
APPLICATION NO. : 09/993328
DATED : January 22, 2008
INVENTOR(S) : Vincent Palermo, Patrick J. Cobler and Neal R. Butler It is certified that error appears in the above-identified patent and that said Letters Patent is hereby corrected as shown below:

Column 9, line 22, delete “the” and insert -- and --
Column 18, line 21, delete “axes” and insert -- axis --
Column 18, line 39, insert -- a -- before the word “wireless”
Column 18, line 39, insert -- movable -- before the word “relative”

Signed and Sealed this

Third Day of June, 2008

JON W. DUDAS
*Director of the United States Patent and Trademark Office*